Figure 1:
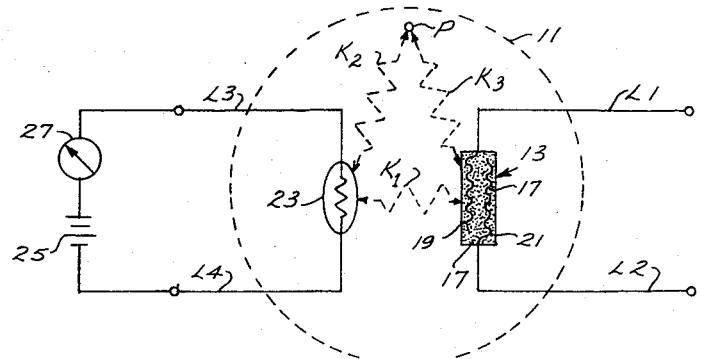

United States Patent

[11] 3,630,084

| [72] | Inventors | Lyle E. McBride, Jr.<br>Norton;<br>Francis P. Buiting, Plainville, both of Mass. |
|---|---|---|
| [21] | Appl. No. | 856,256 |
| [22] | Filed | Sept. 9, 1969 |
| [45] | Patented | Dec. 28, 1971 |
| [73] | Assignee | Texas Instruments Incorporated<br>Dallas, Tex. |

[54] COMFORT INDEX INDICATOR
3 Claims, 3 Drawing Figs.

[52] U.S. Cl. .................................................. 73/336,
73/336.5, 73/337.5
[51] Int. Cl. ................................................ G01w 1/06,
G01n 25/64, G01r 25/66
[50] Field of Search ......................................... 73/336,
336.5, 17 A, 335

[56] References Cited
UNITED STATES PATENTS
2,554,440  5/1951  Coburn ........................  73/336

3,053,090  9/1962  Ingersoll ........................  73/336
3,175,400  3/1965  Amdur ..........................  73/336.5
3,213,688  10/1965  Huston ..........................  73/368.6

*Primary Examiner*—Louis R. Prince
*Assistant Examiner*—Denis E. Corr
*Attorneys*—Harold Levine, Edward J. Connors, Jr., John A. Haug, James P. McAndrews and Gerald B. Epstein ABSTRACT: Apparatus for measuring and indicating the comfort index of an ambient atmospheric environment subject to variations in dewpoint and dry bulb temperature. A heat source is provided which includes means for maintaining it at a temperature which varies as a substantially linear function of the dewpoint. Thermally coupled both to the heat source and the environment and thermally responsive thereto is means, e.g., a thermistor, for indicating a temperature which is the sum of linear functions of the heat source temperature and dry bulb temperature, this means being approximately 0.122 times as responsive to variations in the heat source temperature as to variations in the dry bulb temperature. The temperature indicated thereby is the measured comfort index.

PATENTED DEC28 1971 3,630,084

Lyle E. McBride, Jr.
Francis P. Buiting
Inventors

COMFORT INDEX INDICATOR

This invention relates to temperature measuring and indicating apparatus and more particularly to such apparatus which is adapted to measure and indicate the comfort index of an ambient atmospheric environment.

It is generally well realized that, as the relative humidity (and accordingly, the dewpoint) of an ambient atmospheric environment decreases, it is necessary to increase the actual air temperature, i.e., the so-called dry bulb temperature of the environment, to maintain the same level of human comfort due to the cooling effect of evaporation from skin surfaces. As a corollary to this, there exists for any particular combination of dewpoint and dry bulb temperature, a human comfort effective temperature or so-called comfort index. Such a temperature, as used and defined by those having skill in the science of heating, refrigerating and air-conditioning, is essentially that which is "felt" by a person exposed to an atmospheric environment having a particular relative humidity and a particular dry bulb temperature. For example, if the relative humidity is 40 percent and the dry bulb temperature 81° F., the comfort index or effective temperature is approximately 73° F. However, if the relative humidity is reduced to 10 percent though the dry bulb temperature remains at 81° F., the comfort index is reduced to about 70° F. Thus a person "feels" cooler because of the increased evaporation from skin surfaces.

In the design of residential heating systems, provision is sometimes made for artificially increasing moisture in a zone heated by the furnace, as by incorporating a humidifier with the furnace. Alternatively, types of thermostat controls have been proposed which can sense, to some extent, the moisture content of the air and which will control the furnace in the manner such as to maintain a constant comfort level. In calibrating and using thermostat controls of the latter type, adjustment difficulty can be encountered in the absence of actual knowledge of the comfort index at any instant in a particular atmospheric environment. Just as it is useful to know the actual temperature in a temperature-controlled zone for the purpose of more accurately determining an appropriate setting for a thermostat, it is useful to know the actual comfort index in a zone where the comfort index in that zone is controlled by a thermostat which is responsive to moisture level in the zone. With knowledge of the comfort index, an accurate thermostat setting is quickly and accurately determined.

There are also situations, other than in residential heating, where it is desirable to quickly and easily determine comfort index. While, in any situation, the comfort index in a particular environment can be determined graphically from a known dry bulb temperature and dewpoint (relative humidity being a known function of these two temperatures), such a graphical technique is cumbersome, inconvenient and time consuming.

Among the several objects of the invention may be noted the provision of apparatus for quickly and easily measuring and indicating the comfort index of an ambient atmospheric environment; the provision of such apparatus which is characterized by extreme simplicity; the provision of such apparatus which is easily and economically manufactured; the provision of such apparatus which is reliable and long lasting in operation. Other objects and features will be in part apparent and in part pointed out hereinafter.

Briefly, apparatus according to the present invention is adapted to measure and indicate the comfort index of an ambient atmospheric environment which is subject to variations in dewpoint and dry bulb temperature. The apparatus includes a heat source including means for maintaining the heat source at a temperature which varies as a substantially linear function of the dewpoint in the atmospheric environment. Means is thermally coupled to both the heat source and the environment and is thermally responsive thereto for indicating a temperature which is the sum of a linear function of the heat source temperature and a linear function of the dry bulb temperature. This means is approximately 0.122 times as responsive to variations in the heat source temperature as to variations in the dry bulb temperature. Accordingly, the temperature indicated thereby is the measured comfort index of the environment.

The invention accordingly comprises the constructions hereinafter described, the scope of the invention being indicated in the following claims.

Figure 2:
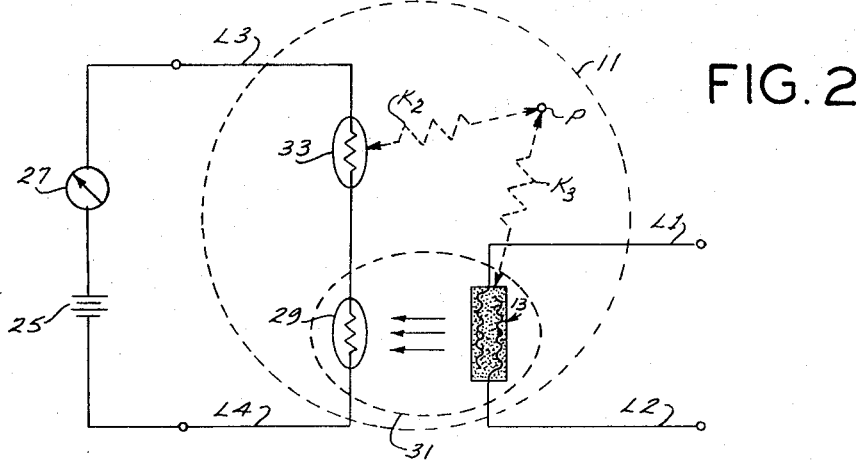
Figure 3:
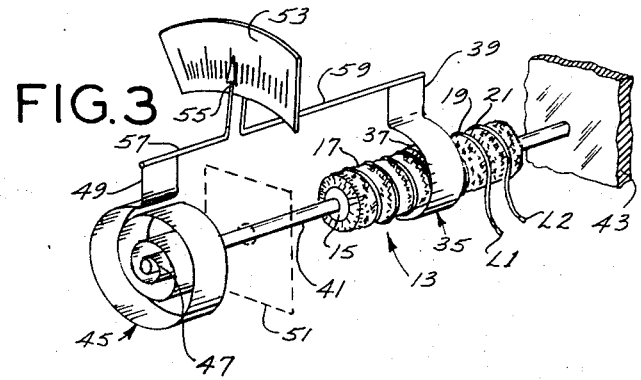

In the accompanying drawings, in which several of various possible embodiments of the invention are illustrated, FIG. 1 is a schematic circuit diagram of apparatus according to the invention employing a single thermistor;

FIG. 2 is a circuit schematic diagram of the second embodiment employing a pair of thermistors; and FIG. 3 is a perspective view of a third embodiment of the invention employing bimetal elements.

Corresponding reference characters indicate corresponding parts throughout the several views of the drawings.

Referring now to the drawings, and more particularly to FIG. 1, indicated generally at 11 is a zone which is representative of an ambient atmospheric environment in which it is desired to measure and indicate the comfort index with apparatus of the present invention. Zone 11 may, for example, comprise the interior of a residential structure. Any point of the atmospheric environment defined by zone 11 is assumed to be subject in variations in relative humidity and actual temperature. In other words, both the dewpoint and the dry bulb temperature may vary. For example, if zone 11 is the interior of a residential structure, it is likely that the humidity therein varies considerably with seasonal changes or increased precipitation.

Indicated generally at 13 is a heat source or humidity sensor. This heat source includes means for maintaining the heat source at a temperature which varies as a substantially linear function of the dewpoint in the atmosphere defined by zone 11. Heat source or sensor 13 is preferably of the type described in greater detail in "The Mode of Operation of Saturation Temperature Hygrometers Based on Electrical Detection of a Salt-Solution Phase Transition," by D. D. Nelson and E. J. Amdur, in Principles and Methods of Measuring Humidity in Gases (R. E. Ruskins, ed.), vol. I, pp. 617–626, Reinhold Pub. Corp. (New York), 1965.

As shown more clearly in FIG. 3, heat source 15 comprises a tubular mandrel 15 upon which is wrapped a porous medium or matrix 17, e.g., cloth, which is impregnated with lithium chloride salts. A pair of wires 19 and 21 are wrapped around a layer of material 17 in the form of a pair of interlaced helixes. Wires 19 and 21 constitute electrodes between which material 17 provides a resistive path. The resistance present between electrode wires 19 and 21 depends upon the water vapor content of the atmosphere around source 13. When a suitable voltage is applied across wires 19 and 21 by means of a pair of leads L1 and L2, source 13 is electrically heated due to resistive consumption of power in the path between the electrode wires 19 and 21 until the surface of material 17 reaches that temperature which corresponds to about 11 percent relative humidity. At this point, absorbed water is given off by the lithium chloride, causing an increased electrical resistance between wires 19 and 21. This increased resistance causes a corresponding decrease in the heat generated to a level just sufficient to maintain the temperature corresponding to 11 percent relative humidity. The temperature at which sensor 13 is maintained is substantially a linear function of the dewpoint of the atmospheric environment. There is thus a particular temperature of this sensor corresponding to each absolute water content of the atmosphere.

Thermally coupled both to the sensor or heat source 13 and to the atmosphere of zone 11 is a thermistor 23. The atmosphere in zone 11 may be regarded as a source of heat and, for purposes of illustration, this source of heat is designated by point P. As between thermistor 23 and heat source or sensor 13, the coefficient of heat transfer is designated $K_1$; the flow of heat between the thermistor and the heat source being represented graphically by a dashed-line resistor symbol. As between the atmosphere and the thermistor, the thermal relationship is similarly graphically illustrated, the coefficient of heat transfer being designated $K_2$. Similarly, the heat transfer between the atmosphere and the heat source is determined by a coefficient of heat transfer $K_3$. The amount of heat which flows between any two of these three thermally coupled elements is proportional to the appropriate coefficient of heat transfer $K_1$, $K_2$ or $K_3$. As those skilled in the art can understand, the temperature T of thermistor 23 can be determined according to the equation $$T = \frac{K_1}{K_1+K_2}T_s + \frac{K_2}{K_1+K_2}T_{db}$$

where $T_s$ is the temperature of heat source 13, and $T_{db}$ is the dry bulb temperature in zone 11.

When using a lithium chloride heat source of the type described above, there can be determined a mathematical relationship between the comfort index in the zone 11, the temperature of heat source 13 and the dry bulb temperature in zone 11. Within a normal comfort range of comfort index, i.e., one in which the comfort index varies from about 65° to 75° F., the relationship between these three temperatures is defined substantially according to the equation $$T_{eff} = 20 + 0.067T_s + 0.55T_{db}$$

where $T_{eff}$ is the comfort index.

We have found that the foregoing relationship can be used to advantage by adjusting the thermal coupling of thermistor 23 with respect to heat source 13 and the environment of zone 11 to provide a ratio (i.e., $K_1/K_2$) of coefficients of heat transfer with respect to the sensor and the atmosphere, respectively, of approximately 0.122. Thermistor 23 will then be 0.122 times as responsive to variations in the heat source temperature as to variations in the dry bulb temperature. Such adjustment of thermal coupling to achieve a ratio of $K_1/K_2 = 0.122$ may be carried out, for example, by selecting an appropriate physical separation between thermistor 23 and heat source 13. When this is done, the temperature of thermistor 23 is proportional to the measured comfort index in zone 11.

Connected across thermistor 23 by means of a pair of leads L3 and L4 is a circuit which functions as means for indicating the comfort index in zone 11 as a function of the resistance of thermistor 23. This resistance-measuring circuit may, for example, comprise a battery 25 and suitable ammeter 27 whose scale is calibrated in degrees of comfort index. Assuming the response of meter 27 to be a linear function of the current flowing therethrough, as is true with the usual type of ammeter, thermistor 23 should be of the type exhibiting a constant temperature coefficient of resistivity over the range of interest and thus its resistivity characteristic is linear in that range. Accordingly, thermistor 23 indicates a temperature which is the sum of a linear function of the heat source temperature and a linear function of the dry bulb temperature. For this purpose, thermistor 23 may exhibit either a positive (PTC) or negative (NTC) temperature coefficient of resistivity, as those skilled in the art will appreciate. Nonlinearity in the thermistor characteristic can, of course, be compensated for by employing a suitably nonlinear ammeter calibration.

Illustrated in FIG. 2 is a second embodiment of the invention wherein a pair of thermistors are series connected. A first thermistor 29 is closely thermally coupled to heat source 13 so that the temperature of thermistor 29 will be substantially equal to the heat source temperature. This thermistor has a constant temperature coefficient of resistivity in the range of interest so that its resistance varies substantially as a linear function of its temperature. The close thermal coupling between thermistor 29 and heat source 13 is indicated by a dashed-line circle 31 and arrows indicate the supply of heat from heat source 13 to thermistor 29. A second thermistor 33 is thermally coupled to the atmosphere defined by zone 11. It is required that thermistor 33 be substantially thermally isolated from heat source 13. Thus it responds only to variations in the temperature of the atmosphere in zone 13, i.e., the dry bulb temperature. Thermistor 33 also has a constant temperature coefficient of resistivity in the range of interest and its resistance thus varies as a linear function of the dry bulb temperature. As in the circuit of FIG. 1, the pair of thermistors together must respond to the dry bulb and heat source temperatures so as to be 0.122 times as responsive to variations in the heat source temperature as to variations in the dry bulb temperature. Preferably, this may be accomplished by selecting the temperature coefficients of resistivity for each of these thermistors so that the temperature coefficient of thermistor 29 is approximately 0.122 times the temperature coefficient of thermistor 33. A circuit like that shown in FIG. 1, including battery 25 and meter 27, is connected across the series-pair of thermistors by means of leads L3 and L4 to function as means for indicating the comfort index in zone 11 as a function of the sum of resistances of thermistors 29 and 33, this sum representing the comfort index.

FIG. 3 illustrates an embodiment of our invention which is, in a sense, a mechanical analog of the circuit of FIG. 2. Rather than employing a pair of thermistors, two bimetal elements are utilized.

A first bimetal element is constituted by a first bimetal strip, designated generally at 35, which is closely thermally coupled to the lithium chloride heat source 13. Strip 35 has an end portion 37 which is fixed, as by being suitably secured to heat source 13. Its other end 39 is a movable portion and moves over an angular distance which varies as a linear function of its temperature which, because of the close thermal coupling, is the heat source temperature.

Heat source 13 is suitably fixed mounted by means of a rod or shaft 41 which extends through the center of the mandrel 15 upon which matrix 17 of the heat source is wound. One end of shaft 41 is nonrotatably secured to a rigid plate 43 or other suitable support. At the other end of shaft 41 is mounted a second bimetal element constituted by a second bimetal strip designated 45. Strip 45 has a fixed end 47 suitably secured to shaft 41. The other end 49 is movable over an angular distance which varies as a linear function of its temperature, i.e., the dry bulb temperature, it being noted that the entire apparatus is located in the atmospheric environment in which it is desired to determine the comfort index.

It is important to note that bimetal strip 45 is sufficiently far removed from heat source 13 as to be substantially thermally isolated therefrom. In lieu of such physical separation, a suitable thermal barrier such as outlined at 51 may be located between strip 45 and heat source 13. In order to assure thermal isolation, shaft 41 is preferably of a material which is a poor thermal conductor, e.g. plastic.

A scale 53 and pointer 55 which is movable over the scale, provide means for visually indicating the comfort index, the scale being calibrated in degrees of comfort index. Pointer 55 is connected by means of a rod 57 to strip end 49. A similar rod 59 connects scale 53 to strip end 39. It should be noted that strips 35 and 45 are oriented with opposite spiral directions such as to cause opposite relative movement of their movable ends 39 and 49, respectively, upon increase in the temperature of the strips. It will thus be seen that the pointer and scale coupling arrangement provides means for mechanically summing the deflections of strip ends 39 and 49 to cause movement of pointer 55 with respect to scale 53.

Analogous to the embodiments of FIGS. 1 and 2 which employed a thermistor or thermistors, the combined response of bimetal strips 35 and 45 is such that they are approximately 0.122 times as responsive to variations in the temperature of heat source 13 as to variations in the dry bulb temperature. In order that this be so, the length of strip 35 closely coupled to heat source 13 may be chosen to be 0.122 of the length of strip 45, it being understood that the movable ends of such bimetal elements deflect through a distance in proportion to the strip length. Alternatively, the relative thickness, flexivity, etc. of the strips, rather than their lengths, may be varied to achieve the same result. When this relationship exists, movement of pointer 55 with respect to scale 53 accurately indicates the comfort index.

From the foregoing, it will be apparent that other suitable arrangements can be constructed for mechanically summing the deflections of the movable ends of strips 35 and 45. For example, ends 49 and 59 may be connected by a link therebetween with pointer 55 being carried by this link. In this case, scale 53 would preferably be secured to rigid means, e.g. plate 43.

It may be seen that each of the embodiments described above provides extremely simple apparatus for quickly and easily indicating comfort index. The simple construction is easily and economically manufactured. Further, by utilizing thermistors or bimetal elements which are not prone to failure, apparatus is provided which is reliable and long lasting in operation.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for measuring and indicating the comfort index of an ambient atmospheric environment which is subject to variations in dewpoint and to variations in the dry bulb temperature, said apparatus comprising:

a heat source including means for maintaining the heat source at a temperature which varies as a function of the dewpoint of said atmospheric environment; and means thermally coupled both to said heat source and to said environment and being thermally responsive thereto for indicating a temperature which is the sum of a linear function of the heat source temperature and a linear function of the dry bulb temperature, whereby the indicated temperature is the measured comfort index, said temperature indicating means comprises a thermistor thermally coupled to said heat source and to said environment to provide a ratio of coefficients of heat transfer with respect to said source and said atmosphere, respectively, of approximately 0.122, said temperature indicating means further comprising means for indicating the comfort index as a function of the resistance of said thermistor, said resistance being proportional to the comfort index.

2. Apparatus for measuring and indicating the comfort index of an ambient atmospheric environment which is subject to variations in dewpoint and to variations in the dry bulb temperature, said apparatus comprising:

a heat source including means for maintaining the heat source at a temperature which varies as a function of the dewpoint of said atmospheric environment; and means thermally coupled both to said heat source and to said environment and being thermally responsive thereto for indicating a temperature which is the sum of a linear function of the heat source temperature and a linear function of the dry bulb temperature, whereby the indicated temperature is the measured comfort index, said temperature-indicating means comprises:

a first thermistor thermally coupled to said heat source to cause the temperature of the thermistor to be substantially equal to the heat source temperature and having a resistance which varies as a linear function of the heat source temperature;

a second thermistor thermally coupled to said atmosphere but substantially thermally isolated from said heat source and having a resistance which varies as a linear function of the dry bulb temperature; and means for indicating the comfort index as a function of the sum of the resistances of said thermistors, said sum being proportional to the comfort index.

3. Apparatus as set forth in claim 2 wherein each of said thermistors has a constant temperature coefficient of resistivity, the coefficient of said second thermistor being approximately 0.122 times the coefficient of said first thermistor.

* * * * *